United States Patent

Hein et al.

[11] Patent Number: 5,131,638
[45] Date of Patent: Jul. 21, 1992

[54] DUAL SHOCK MOUNT

[75] Inventors: Richard D. Hein, Wabash; Bradley G. Hampton, Tipton, both of Ind.

[73] Assignee: GenCorp Inc., Fairlawn, Ohio

[21] Appl. No.: 590,726

[22] Filed: Oct. 1, 1990

[51] Int. Cl.$^5$ .................... B60G 11/22; F16F 1/44
[52] U.S. Cl. ......................... 267/220; 267/293; 267/141.4; 280/668
[58] Field of Search ............ 264/293, 281, 141.2, 264/220, 140; 280/668, 673, 696, 710; 267/140.1 C, 141.4, 219

[56] References Cited

U.S. PATENT DOCUMENTS

| | | | |
|---|---|---|---|
| 2,858,127 | 10/1958 | Moulton | 267/293 |
| 4,014,588 | 3/1977 | Kohriyama | 267/141.4 X |
| 4,377,216 | 3/1983 | Ueno | 267/140.1 C X |
| 4,478,396 | 10/1984 | Kawaura | 280/668 X |
| 4,673,192 | 6/1987 | Krehan et al. | 280/668 |
| 4,712,775 | 12/1987 | Buma et al. | 267/220 |
| 4,767,108 | 8/1988 | Tanaka et al. | 267/140.1 C |
| 4,804,169 | 2/1989 | Hassan | 280/668 X |
| 4,822,010 | 4/1989 | Thorn | 267/140.1 C |
| 4,834,351 | 5/1989 | Freudenberg et al. | 267/219 X |
| 4,909,642 | 3/1990 | Hoermandinger | 267/220 X |
| 5,009,401 | 4/1991 | Weitzenhof | 280/668 X |

FOREIGN PATENT DOCUMENTS

| | | | |
|---|---|---|---|
| 0381560 | 8/1990 | European Pat. Off. | 267/220 |
| 2548972 | 1/1985 | France | 267/220 |
| 1206895 | 9/1970 | United Kingdom | 267/293 |
| 1530312 | 10/1978 | United Kingdom | 267/281 |
| 2172960 | 10/1986 | United Kingdom | 280/668 |

*Primary Examiner*—Robert J. Oberleitner
*Assistant Examiner*—Peter M. Poon

[57] ABSTRACT

A shock absorber mount for an automobile is described as having a pair of concentrically disposed pressed fittings in abutting end-to-end relation. Each fitting includes a pair of radially spaced, cylindrical metal sleeves separated by a rubber insert which has an inwardly directed annular cavity or void which confronts an annular cavity in the opposed pressed fitting.

7 Claims, 2 Drawing Sheets

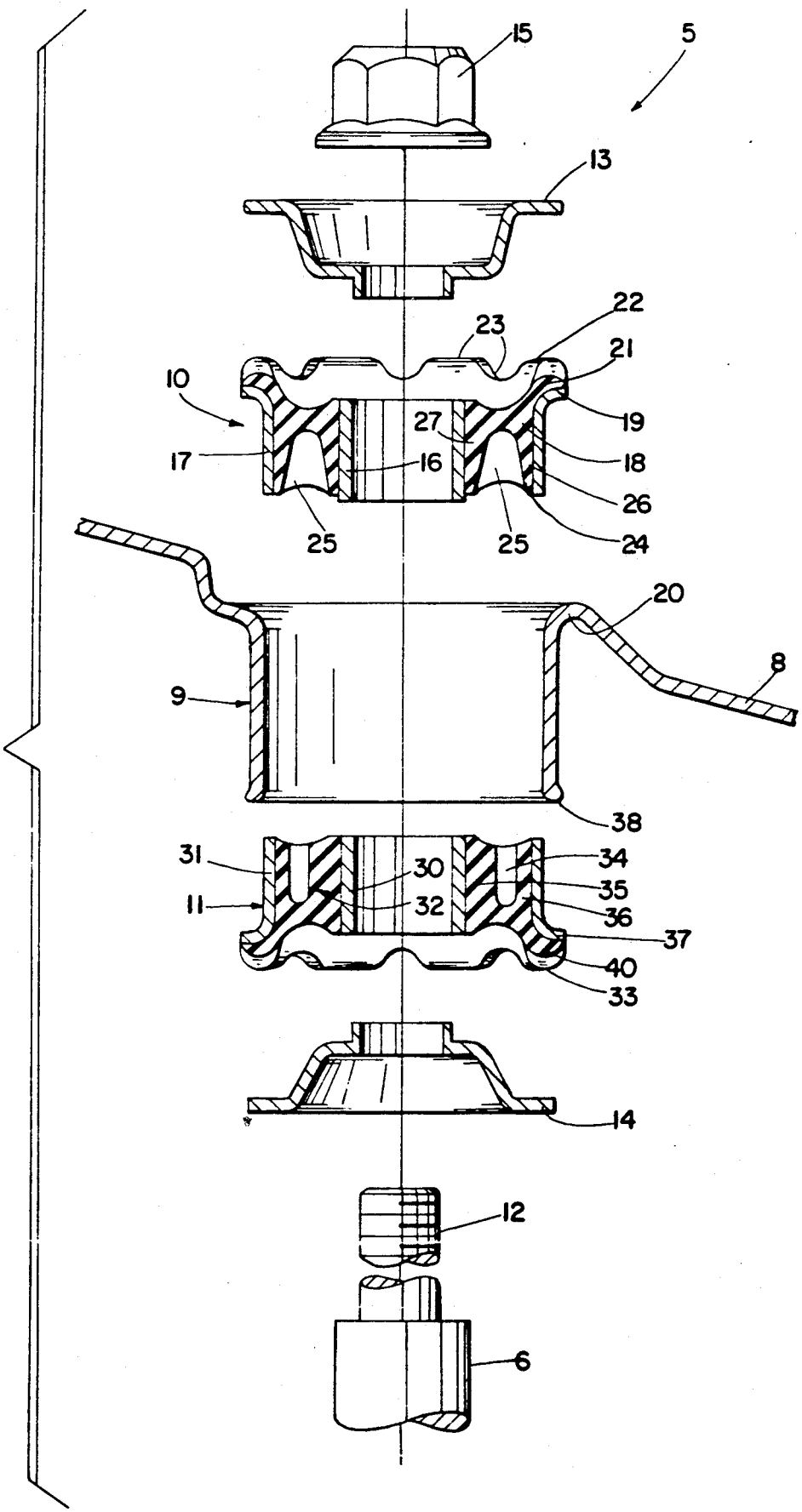

DUAL SHOCK MOUNT

BACKGROUND OF THE INVENTION

The invention relates to a shock dampening mount which employs resilient elastomeric cushions, especially a mount that is interposed between a conventional shock absorber and an automobile frame. Two important parameters for designing such a mount are, I) a low axial rate of shock absorption to control noise and vibration entering the passenger compartment and II) a high radial rate of shock absorption to provide better vehicle handling. The invention was designed with this purpose in mind.

Briefly stated, the invention is in a shock absorber mount which comprises two annular parts which are in axially aligned, abutting end-to-end relation. Each part has a pair of concentrically disposed, cylindrical metal sleeves which are radially spaced by a resilient elastomeric insert. The inserts have confronting voids which extend from each other into the inserts.

Because of their simplicity of design, the parts are easily assembled and relatively inexpensive to manufacture. Also the parts can be tuned to different shock absorption rates by changing the elastomers of the inserts, or the voids in the inserts, or the geometric shape of the metal sleeves surrounding the inserts.

U.S. Pat. No. 4,007,924 shows and describes an elastic support mount which utilizes two solid elastomeric inserts which do not have surrounding metal sleeves. This is understandable since the parts of the mount are designed for a different purpose. The same can be said for the jounce bumper of U.S. Pat. No. 4,690,428 which has a surrounding coil spring, and the resilient couplings of U.S. Pat. No. 4,240,763. The foregoing invention is radically different from anything shown in the aforementioned patents because of the totally different design parameters required.

DESCRIPTION OF THE DRAWING

The following description of the invention will be better understood by having reference to the accompanying drawing, wherein:

FIG. 2 is an exploded view of the mount, showing the parts in cross-section.

DETAILED DESCRIPTION OF DRAWING

Figure 1:
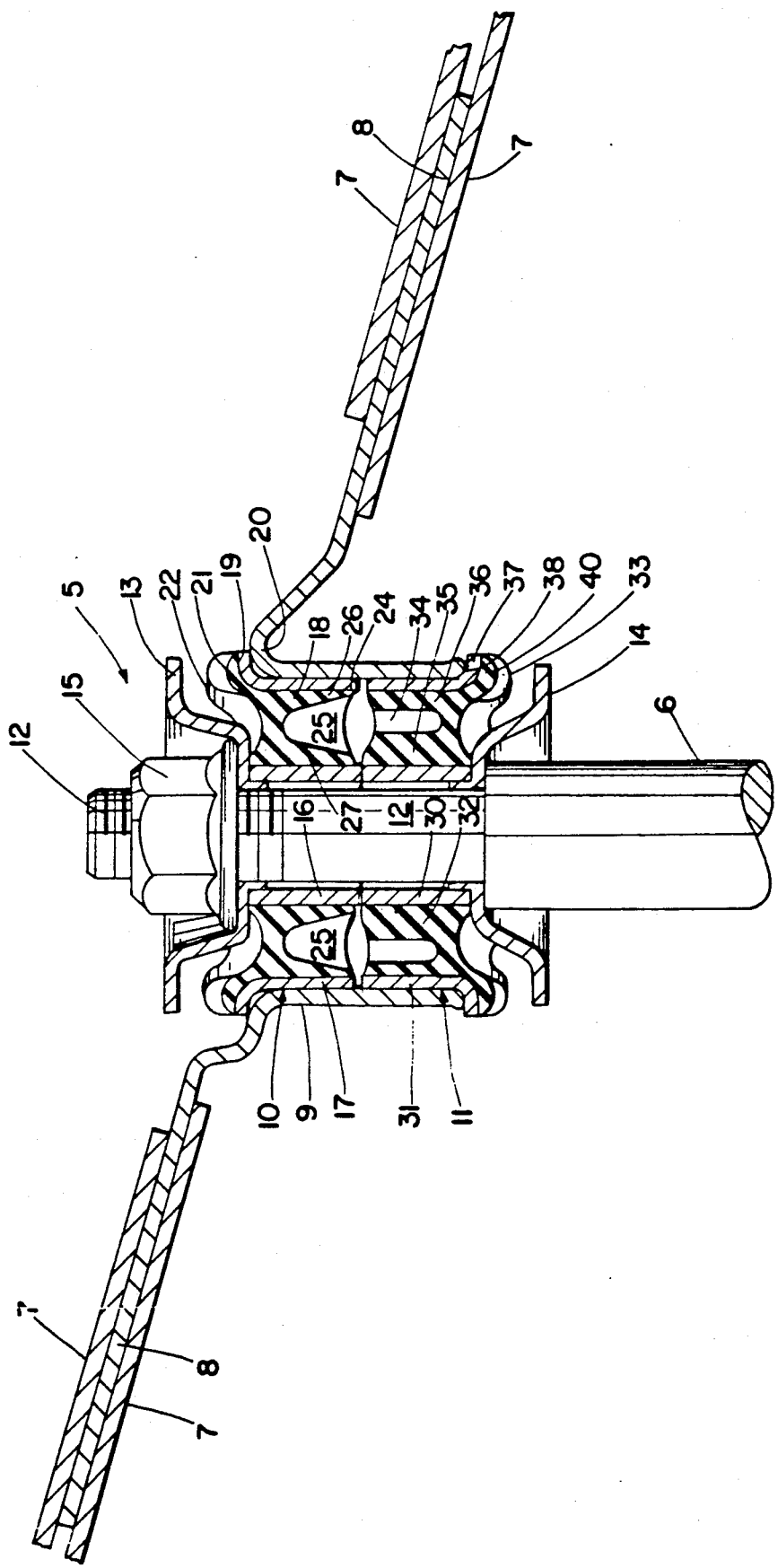
FIG. 1 is an assembly drawing of a shock absorber mount which is made in accordance with the invention, the two main parts of the mount being shown in cross-section.

With reference to the drawing, there is shown a shock absorbing mount 5 for securing a conventional shock absorber 6 to an automobile frame 7. The mount 5, when assembled as in FIG. 1, comprises a metal mounting plate 8 which is secured to the adjacent automobile frame 7, the plate 8 having a vertically disposed, hollow cylindrical housing 9 for receiving a pair of upper and lower pressed fittings, 10, 11, which surround the upper shaft 12 of the shock absorber 6, and which are held therein the housing by a pair of vertically spaced metal washers 13, 14 and lock nut 15.

The upper pressed fitting 10 comprises a pair of concentrically disposed metal sleeves 16, 17 which are radially spaced by a resilient, annular insert 18 which is comprised of any suitable resilient elastomeric material, e.g. rubber. The upper end 19 of the outer sleeve 17 is curved or flared outwardly to rest on the adjacent, upper curved end 20 of the housing 9 to limit travel of the upper pressed fitting 10 in the direction of the lower pressed fitting 11. The upper, radially outermost end 21 of the rubber insert 18 is matingly curved to rest atop the outwardly curved flange 19 of the outer sleeve 17. An annular rubber collar 22, integral with the rubber insert 18, is formed atop the insert 18 and flange 21, and is provided with a corrugated outer end 23, for engaging the upper metal washer 13, depending on the transitional design parameters desired between the upper washer 13 and upper pressed fitting 10. The vertically lowermost end 24 of the rubber insert 18 is provided with an inwardly directed, annular void or cavity 25, the size and shape of which are depended on the sock absorbing characteristics desired. In this particular instance, the sidewalls 26, 27 of the insert 18 surrounding the annular cavity 25 are tapering and become thicker in the direction of the upper collar 22.

The lower pressed fitting 11 is similar, in design, to the upper pressed fitting 10 in that it has a pair of radially spaced inner and outer cylindrical metal sleeves 30, 31, between which is a lower rubber insert 32 which, likewise, has a corrugated outer rubber collar 33, and an annular void or cavity 34 which confronts the cavity 25 of the upper pressed fitting 10. The radially innermost sidewall 35 of the lower cavity 34 is substantially thicker, in this case, than the radially outermost sidewall 36 of the lower cavity 34. The lower end 37 of the lower outer sleeve 31 is also curved or flared outwardly to engage the adjacent lower circular end 38 of the metal housing 9. So too is the lower end 40 of the lower insert 32 matingly curved to rest against the flanged end 37 of the lower outer sleeve 31.

It can be appreciated by those skilled in the art, that the upper and lower pressed fittings 10, 11 will coact to cushion or dampen axial and radial forces exerted against them. The dampening characteristics of these fittings can be tuned, as previously mentioned, by varying the composition of the resilient inserts, or by varying the size or shape of the cavities in the inserts, or by varying the configuration of the metal sleeves of the fittings.

Thus, there has been described a unique shock absorbing mount which is comprised of a pair of pressed fittings with rubber inserts, which are mounted together in end-to-end abutting relation. Further, the rubber inserts are provided with confronting cavities which are sized and shaped in accordance with the cushioning or dampening characteristics desired.

What is claimed is:

1. A shock absorbing mount, comprising a pair of fittings in end-to-end relation, each of the fittings having:
    a hollow, cylindrical, inner metal sleeve and a separate, larger diameter, hollow, cylindrical, outer metal sleeve in radially spaced relation from the inner sleeve;
    a separate, resilient, elastomeric, annular insert secured between the inner and outer sleeves of each of the fittings, the inserts having a pair of confronting ends in close proximity for engagement when the mount is under a sufficient axial load;
    the inner sleeves of the fittings being aligned in end-to-end contact, and the separate outer sleeves being aligned in end-to-end spaced relation; and each of the inserts having an annular cavity which extends inwardly of the insert from the associated confronting end thereof.

2. A shock absorbing mount, comprising a vertically uppermost shock absorbing fitting in end-to-end concentric abutting relation with a vertically lowermost shock absorbing fitting, when the fittings are mounted together in vertical relation around a shaft of a shock absorber, the upper fitting including:
  a) a pair of cylindrical, hollow metal sleeves concentrically disposed about the vertical axis of the shaft, including an outer metal sleeve radially spaced from the axis a distance farther than an inner metal sleeve, the vertically uppermost end of the outer sleeve being curved outwardly from the axis to form a curved flange which is designed to engage a mounting plate to limit travel of the outer sleeve in a vertical direction towards the lower fitting; and
  b) a resilient, elastomeric annular insert secured between the sleeves, the insert having a vertically uppermost annular flanged portion which is matingly curved to rest atop the flange of the outer sleeve, the insert having an annular cavity extending inwardly of the insert from the end of the insert confronting the lower fitting; and the lower fitting including:
  c) a separate pair of radially spaced, cylindrical, hollow metal sleeves in vertical alignment with the sleeves of the upper fitting, the inner and outer sleeves of the fittings being similarly shaped but oppositely disposed, the lower out sleeve having an end, farthest spaced from the upper fitting, which is curved outwardly from the axis to engage an opposite end of the mounting plate to limit travel of the lower outer sleeve in the direction of the upper fitting; the inner sleeves of the fittings being in direct contact, and the outer sleeves of the fittings being in axial spaced relation; and
  d) a separate, resilient, elastomeric, annular insert secured between the metal sleeves of the lower fitting, the insert having a vertically lowermost annular flanged portion which is matingly curved to rest against the lowermost flanged end of the outer sleeve of the lower fitting, the lower insert having an annular cavity which extends inwardly of the lower insert from the end of the insert confronting the upper fitting, the confronting ends of the inserts being in close proximity for engagement when a sufficient axial load is applied to the mount.

3. The shock absorbing mount of claim 2, wherein opposing sidewall portions of the cavity of the insert of the upper fitting converge in a direction away from the lower fitting.

4. The shock absorbing mount of claim 3, wherein opposing sidewalls of the cavity of the insert of the lower fitting are substantially parallel and the sidewall closest the outer sleeve is substantially thinner than the sidewall closest the inner sleeve.

5. The shock absorbing mount of claim 4, wherein each insert includes a resilient elastomeric collar for engaging an adjacent metal washer, the collars being integral with the inserts.

6. The shock absorbing mount of claim 5, wherein the collars have a corrugated outer edge for engaging adjacent metal washers between which the fittings are held.

7. The shock absorbing mount of claim 6, wherein the elastomeric inserts are rubber, which is pressed between the sleeves.

* * * * *